(12) United States Patent
van Savooijen et al.

(10) Patent No.: US 8,783,471 B2
(45) Date of Patent: Jul. 22, 2014

(54) FILTER ASSEMBLY, A FILTER ELEMENT, AND A METHOD FOR REPLACING A FILTER ELEMENT

(75) Inventors: Henk van Savooijen, Almelo (NL); Pieter van Gisbergen, Arnhem (NL); Richard Theodorus Antonius Arts, Deest (NL); Marinus Johannes Berend van Boven, Wageningen (NL)

(73) Assignee: Parker Hannifin Manufacturing Netherlands (Filtration) B.V., Arnhem (NL)

( * ) Notice: Subject to any disclaimer, the term of this patent is extended or adjusted under 35 U.S.C. 154(b) by 234 days.

(21) Appl. No.: 13/264,899

(22) PCT Filed: Oct. 30, 2009

(86) PCT No.: PCT/NL2009/000206
§ 371 (c)(1), (2), (4) Date: Oct. 17, 2011

(87) PCT Pub. No.: WO2010/123344
PCT Pub. Date: Oct. 28, 2010

(65) Prior Publication Data
US 2012/0031828 A1  Feb. 9, 2012

(30) Foreign Application Priority Data

Apr. 20, 2009 (WO) ............... PCT/NL2009/000098

(51) Int. Cl.
*B01D 35/30* (2006.01)
*B01D 29/96* (2006.01)

(52) U.S. Cl.
USPC ........... 210/454; 210/232; 210/236; 210/435; 210/440; 210/443; 210/450; 210/451; 210/457

(58) Field of Classification Search
None
See application file for complete search history.

(56) References Cited

U.S. PATENT DOCUMENTS

| 3,615,016 A | 10/1971 | Soriente et al. |
| 5,045,192 A | 9/1991 | Terhune |
| 2002/0144937 A1 | 10/2002 | Wilberscheid et al. |
| 2004/0149640 A1* | 8/2004 | Hennes et al. ............... 210/232 |
| 2007/0158263 A1 | 7/2007 | Brandt et al. |

(Continued)

FOREIGN PATENT DOCUMENTS

| WO | 02078816 A1 | 10/2002 |
| WO | 2008017492 A2 | 2/2008 |

OTHER PUBLICATIONS

English machine translation for WO 2008017492 (A2).

*Primary Examiner* — Benjamin Kurtz
(74) *Attorney, Agent, or Firm* — Hoffmann & Baron, LLP

(57) ABSTRACT

A filter assembly includes a head, a filter housing which can be connected to the head, and a filter element which can be received in the filter housing. The filter element includes a tubular wall provided with a filtration medium; a first end part provided at a first axial end of the filter element; and a second end part provided at a second axial end of the filter element. The second end part of the filter element is provided with a either a protrusion or an undercut opening, on the one hand, and the second end of the housing is provided with either an undercut opening or a protrusion, on the other hand. A side of the protrusion or opening is provided with a sloping face which slopes at a slope with respect to the axial direction of the filter element.

31 Claims, 6 Drawing Sheets

(56) References Cited

U.S. PATENT DOCUMENTS

2008/0245725 A1 10/2008 Patel et al.
2009/0242472 A1 10/2009 Wallerstorfer et al.
2009/0242473 A1 10/2009 Wallerstorfer et al.
2009/0266757 A1 10/2009 Wallerstorfer et al.
2009/0283467 A1 11/2009 Wallerstorfer et al.

* cited by examiner

US 8,783,471 B2

FILTER ASSEMBLY, A FILTER ELEMENT, AND A METHOD FOR REPLACING A FILTER ELEMENT

CROSS-REFERENCE TO RELATED APPLICATIONS

This application is the National Stage of International Application No. PCT/NL2009/000206, filed Oct. 30, 2009, which claims the benefit of International Application No. PCT/NL2009/000098, filed Apr. 20, 2009, the contents of which is incorporated by reference herein.

FIELD OF THE INVENTION

The present invention relates to a filter assembly used, for example, in a fluid recirculation system of a hydraulic circuit or the like, in order to catch foreign matter, contaminants, polyethanes and the like in the fluid. A filter assembly of this type may, for example, be used to filter oil of a lubrication system or a hydraulic system of a crane. The oil may be forced through the system by a pump. The pump can be driven by an electrical motor or a combustion engine such as a diesel engine.

BACKGROUND OF THE INVENTION

A filter assembly for filtering a fluid is known from a variety of applications including hydraulic systems, fuel systems and engine lubrication systems. The filter assembly is provided with a replaceable filter element that can be accommodated in a filter housing. The filter housing is removably connected to a head, for example by screwing. The head has an inlet and an outlet. The fluid flows into the inlet of the head into the filter housing, passes through the filter element and flows out from the outlet of the head, so that any foreign material and the like within the fluid is caught and removed by the filter element as the fluid passes through the filter element.

The fluid to be filtered may enter the annular space between the filter element and the housing via the inlet in the head, after which the fluid is distributed along the outer circumferential surface of the filter element. The fluid then flows radially inward through the filter element whereby contaminants in the fluid are captured by the filter element. The filtered fluid subsequently flows to the outlet of the head. Alternatively, the flow may be reversed i.e. the contaminated fluid enters the interior of the filter element and is then forced through the filter element, thereby flowing substantially radially outward.

With use, the filter element undergoes gradual degradation of its performance due to clogging. The filter element may become clogged to the extent that it causes a problem in the hydraulic system, such as inadequate flow to components downstream of the filter, excessive pressures upstream of the filter element, and/or damage to the filter element allowing the accumulated contaminants to flow to components downstream of the filter element. This can be avoided by periodic replacement of the filter element or after the need for replacement has been brought to the attention of an operator of the system. Thus, the filter element of the filter assembly is replaced regularly.

The filter element is locked within the filter housing in operation. When replacing the filter element by a new filter element, the filter housing is disassembled from the head and the filter element is removed. This can be relatively difficult and also there are problems that arise with respect to environmental concerns. Nowadays, according to prior art, the filter element stays attached to the head when the filter housing is removed from the head. Only after removing the filter housing, the filter element can be disconnected and removed from the head. Taking into account the length of the filter element and housing this obviously requires a large removal height. Under the housing a free space of approximately the axial length of the filter element is required in order to be able to remove the housing. After removing the housing, subsequent removal of the filter element from the head is hindered by the filter element being wet and slippery from oil whilst large forces are required for removing the (still attached) filter element from the head. Removal or displacement of the filter element thus is complicated. A further disadvantage of the filter element initially staying attached to the head is that oil drips from the filter element onto a machine or floor below it.

SUMMARY OF THE INVENTION

The object of the invention is to provide a filter assembly which can be replaced in a simple manner.

Said object is achieved according to the invention by a filter assembly, comprising a head, a filter housing which can be removably connected to the head, and a filter element which can be received in the filter housing,
  the filter element comprising:
    a tubular wall provided with a filtration medium;
    a first end part provided at a first axial end of the filter element; and
    a second end part provided at a second axial end (30) of the filter element;
  the filter housing comprising a first axial end and a second axial end, wherein the first axial end is provided with a first rotational connector part;
  the head comprising a second rotational connector part which can be removably engaged by the first rotational connector parts,
wherein the housing can be connected to the head by rotating the housing with respect to the head in a first direction of rotation and wherein the housing can be detached from the head by rotating the housing with respect to the head in a second direction of rotation, the second direction of rotation being opposite to the first direction of rotation;
wherein the second end part of the filter element and the second axial end of the filter housing are provided with a locking assembly comprising:
    an opening provided at one of either the filter element or the filter housing; and
    a protrusion provided at the other one of either the filter element or the filter housing which is adapted to project in the opening;
wherein the opening comprises a mouth which opens in axial direction, which mouth is, viewed in tangential direction, wider than, viewed in tangential direction, the protrusion for allowing the protrusion to enter into the opening when inserting the filter element, with its second end part directed to the second axial end of the filter housing, axially into the housing and for allowing the protrusion to be withdrawn from the opening when removing the filter element axially out of the housing;
wherein the opening comprises a sloping side wall face sloping with respect to the axial direction, which sloping side wall face, viewed in axial direction from the mouth into the opening, widens said opening such that, when the protrusion has been received in the opening and is withdrawn axially from the opening, the sloping side wall face guides the protrusion in the second direction of rotation out of the mouth.

The opening (further also called 'undercut' opening) is by virtue of the sloping side wall face 'undercut', i.e. the opening has at least one portion which is, viewed parallel to the mouth, wider than the mouth. The undercut opening provides that engagement between the housing and filter element is possible and that, after removing the housing and filter element together from the head, the filter element can easily be removed from the housing by just exerting an axial pulling force. The sloping side wall face ensures that the protrusion is—if not already aligned in front of the mouth of the opening—guided to the mouth of the opening to allow leaving the opening through the mouth.

It is noted that the first rotational connector part and second rotational connector part may according to the invention comprise mutually mating screw threads. Taking into account that with screw threads the clockwise direction is in general the fixation direction and the anti-clockwise direction is in general the loosening direction, the first rotational direction will in case of screw threads in general be the clockwise direction (viewed from the second axial end of the filter housing to the first axial end of the filter housing), whilst the second rotational direction then will be the anti-clockwise direction. With screw thread pitched in opposite direction, this will however be the other way around.

According to a further embodiment of the invention, the side of the protrusion facing the sloping side wall face of the opening is provided with a sloping protrusion face having a slope ($\alpha$) which corresponds to the slope ($\alpha$) of the sloping side wall face. This improves on the one hand guiding of the protrusion to the mouth when removing the filter element from the housing, whilst on the other hand it improves engagement between the sloping side wall face and the protrusion.

According to a further embodiment of the invention, the slope of the side wall face—and if present also the slope of the sloping protrusion face—is in the range of 20°-40°, such as about 30°, with respect to the axial direction. This provides both good engagement and guiding function.

According to the invention it is either—first configuration—possible to provide the filter element with the protrusion and the housing with the opening, or—second configuration—to provide the housing with the opening an over the first configuration in that a slimmer design with less use of material becomes possible. In a further embodiment of this first configuration, the sloping side wall face of the opening is, viewed in axial direction from the second end part of the filter element to the first end part of the filter element, arranged at that side of the opening which faces, with respect to the longitudinal axis of the filter element, in said second direction of rotation. In a further embodiment of the second configuration, the sloping side wall face of the opening is, viewed in axial direction from the second end part of the filter element to the first end part of the filter element, arranged at that side of the opening which faces, with respect to the longitudinal axis of the filter element, in said first direction of rotation. Both the further embodiment of the first configuration and the further embodiment of the second configuration, provide that when removing the filter housing from the head by rotating the housing with respect to the head in the second direction of rotation, the filter element is drawn tight towards the second axial end of the filter housing by tangential engagement of the sloping side wall face of the opening with the protrusion. Thus, the filter housing is removed from the head easily together with the filter element, which stays accommodated in the filter housing. The required removal height for removing the housing is hereby considerably reduced. This removal height can even be reduced up to the axial extension height of the screw thread. Further dripping problems are avoided as dripping from the filter element is collected in the housing. Further removal of the filter element from the housing is easy and requires only low axial forces, as explained earlier.

When a filter element is to be replaced in the filter assembly according to the invention, the following procedure can be carried out.

In an operating condition, the filter housing is connected to the head and the filter element has been received in the filter housing with the protrusion projecting in the opening. The filter housing comprises a cylindrical body which is adapted to receive the hollow interior of the filter element. When the housing is not attached to the head, the filter element can be rotated with respect to the cylindrical body of the filter housing in order to align the protrusion with the mouth of the opening for allowing the protrusion to be received in the opening. The protrusion and undercut opening are configured to allow tangential movement of the protrusion with respect to the opening such that, when the protrusion has been received in the opening, the protrusion is movable between a position in which the protrusion is aligned with the mouth of the opening and a position in which the protrusion, viewed in axial direction, overlaps at least partially with the sloping side wall face.

For replacing the filter element, the filter housing is removed from the head by rotating the housing with respect to the head in the second direction of rotation, in which the filter element is drawn tight towards the second axial end of the filter housing by tangential engagement of the sloping side wall face of the opening with the protrusion. Thus, the filter housing is removed from the head easily together with the filter element accommodated in the filter housing.

Then, the filter element is removed from the housing in axial direction by pulling the filter element in axial direction away from the second axial end of the housing so that the protrusion is withdrawn axially from the opening through the mouth. The opening is undercut, i.e. the opening extending from the mouth has at least one portion which is wider than the mouth. When withdrawing the protrusion axially from the opening, the protrusion will be guided to the mouth as a result of the sloping side wall face. The sloping side wall face forces the protrusion and opening to rotate slightly with respect to each other when withdrawing the protrusion axially from the opening. Thus, when exerting a pulling force in axial direction only, the sloping side wall face will guarantee that the protrusion is guided to the mouth of the opening. The filter element can be removed from the filter housing in a simple and reliable manner. There is no need for heavy turning and puling as required by prior art constructions or in case of a regular bayonet closure between filter element and housing.

Next, a new filter element can be inserted axially into the housing and the filter housing with the accommodated new filter element is connected to the head by rotating the housing with respect to the head in the first direction of rotation. In case the protrusion is not already received in the opening, rotating the housing with respect to the head in the first direction will—due to friction between the filter element and the head—align the protrusion axially with the mouth and the protrusion axially enters into the opening through the mouth. After the protrusion entering the opening, the new filter element is in rotational direction locked with respect to the filter housing.

In an embodiment the side of the protrusion facing the sloping side wall face of the opening is provided with a sloping protrusion face having a slope which corresponds to the slope of the sloping side wall face. In this case, the sloping side wall face of the opening and the corresponding sloping protrusion face provide a reliable locking assembly which allows smooth removal of the filter element from the filter housing at the same time.

It is possible that the slope of the side wall face is in the range of 20°-40°, like about 30°, with respect to the axial direction. However, the slope of the side wall face can be designed in a different manner.

In an embodiment the filter element is provided with the protrusion, wherein the filter housing is provided with the opening, wherein the mouth opens into the direction of the first axial end of the filter housing, and wherein the sloping side wall face, viewed from the second axial end to the first axial end, slopes in the second direction of rotation such that, when the filter housing is being removed from the head by rotating the housing with respect to the head in the second direction of rotation, the filter element is drawn tight towards the second axial end of the filter housing by engagement of the sloping side wall face of the opening with the protrusion.

Alternatively, the filter element is provided with the opening, wherein the filter housing is provided with the protrusion, and wherein the mouth opens into the direction of the second axial end of the filter housing, and wherein the sloping side wall face, viewed from the first axial end to the second axial end, slopes in the first direction of rotation such that, when the filter housing is being removed from the head by rotating the housing with respect to the head in the second direction (B) of rotation, the filter element is drawn tight towards the second axial end (18) of the filter housing (15) by engagement of the sloping side wall face (24) of the opening (21) with the protrusion (22).

In an embodiment the opening is provided in a ring shaped wall, wherein, viewed in tangential direction, the mouth has a first side where the sloping side wall face is provided and an opposing second side; and wherein the ring shaped wall is provided with an axial projection, the axial projection being arranged adjacent the mouth at the second side of the mouth. The second side of the opening might extend essentially in axial direction. As a result, when the filter element is rotated with respect to the filter housing, the axial projection forms a stop for aligning the protrusion and the opening with respect to each other. Thus, when inserting a filter element in the filter housing, it can be detected that the protrusion and the opening are aligned in the right manner without the protrusion and opening being visible.

In that case, it is possible that the ring shaped wall has an axially facing front face, which is shaped with a pitch angle, the pitch angle being preferably at most 10°. The axially facing front face thus extends like about one revolution of a screw thread. The pitch angle virtually increases the height of the axial projection, so that the axial projection can remain relatively small while still being able to stop the protrusion when rotating the filter element with respect to the housing.

In an embodiment the projection has a guide surface for guiding the protrusion over the projection when the protrusion moves over the projection from its side opposing the side adjacent the mouth towards the mouth. When rotating the filter element with respect to the housing in the first direction of rotation, the protrusion follows the front face of the ring shaped wall and runs up along the guide surface of the projection. The protrusion moves axially into the opening immediately behind the projection.

In an embodiment the second end part of the filter element is provided with a sealing ring, such as an O-ring, having a ring axis perpendicular to a sealing ring plane defined by the sealing ring, wherein the ring axis and the longitudinal axis of the filter element extend at an acute angle with respect to each other, preferably in the range of 4-15°, and wherein the filter housing is provided at its second axial end with a sealing seat which is adapted to the sealing ring for sealing the interior of the filter element with respect to the second axial end of the filter housing. This embodiment with inclined sealing ring reduces friction when removing a filter element from the housing and placing the filter element into the housing. Further, it appears that, an inclined sealing ring of this type has improved sealing properties in comparison to a sealing ring having a ring axis coinciding with the longitudinal axis of the filter element.

In an embodiment the sealing seat faces radially; wherein a ring front face facing axially towards the first axial end adjoins the sealing seat; wherein the ring front face defines a ring front face plane; and wherein, when the protrusion has been received in the opening, the ring front face plane is parallel to the sealing ring plane. The sealing ring seals off the interior of the filter element with respect to the second axial end of the filter housing when the protrusion has been accommodated in the opening. When the filter element is rotated from this angular position with respect to the filter housing, the sealing of the sealing is broken. When the protrusion is not aligned with the mouth of the opening, the sealing ring will only partly engage the sealing seat—if contacting it at all—. Consequently the sealing ring will not be stretched but still be in a relaxed state, which in turn means that wear of the sealing ring due to rotation of the sealing ring with respect to the sealing seat is reduced.

In an embodiment, the sealing ring is at a distance from the sealing seat when the protrusion has been axially aligned with the mouth and positioned outside the opening directly adjacent the mouth. The sealing ring seals off only after the protrusion has been accommodated in the mouth.

The invention also relates to a filter element comprising:
a tubular wall provided with a filtration medium;
a first end part provided at a first axial end of the filter element; and
a second end part provided at a second axial end of the filter element;
wherein the second end part of the filter element is provided with a protrusion, and wherein a side of the protrusion is provided with a sloping protrusion face which slopes at a slope with respect to the axial direction of the filter element. According to a further embodiment of this filter element according to the invention the sloping protrusion face is, viewed in axial direction from the second end part of the filter element to the first end part of the filter element, arranged at that side of the protrusion which faces, tangentially with respect to the longitudinal axis of the filter element, in clockwise direction.

Furthermore, the invention relates to a filter element comprising:
a tubular wall provided with a filtration medium;
a first end part provided at a first axial end of the filter element; and
a second end part provided at a second axial end of the filter element;
wherein the second end part of the filter element is provided with an opening which comprises a mouth which opens in axial direction, and wherein the opening is, viewed from the mouth, undercut, and wherein the opening comprises a sloping side wall face which slopes at a slope with respect to the axial direction of the filter element, and wherein the sloping side wall face, viewed in axial direction from the mouth into the opening, widens said opening. According to a further embodiment of this filter element according to the invention the sloping side wall face is, viewed in axial direction from the second end part of the filter element to the first end part of the filter element, arranged at that side of the opening which faces, tangentially with respect to the longitudinal axis of the filter element, in clock-wise direction.

These filter elements can be adapted for insertion into a filter housing of a filter assembly as described above. The filter housing comprises a first axial end and a second axial end. The first axial end is provided with a first rotational connector part which can be removably engaged with a second rotational connector part of a head for attaching the filter housing to the head by rotating the filter housing with respect to the head in a first direction of rotation and for detaching the housing from the head by rotating the filter housing with respect to the head in a second direction of rotation. The second direction of rotation is opposite to the first direction of rotation.

The second end part of the filter element comprises either an opening or a protrusion. In addition, the second end part of the filter housing is provided with a protrusion or an opening which is adapted to engage with the opening or the protrusion of the filter element, respectively, for locking the filter element and the filter housing with respect to each other.

In an embodiment, the filter element is provided with the protrusion and the filter housing comprises the opening. The side of the protrusion facing the sloping side wall face of the opening is provided with a sloping protrusion face having a slope which corresponds to the slope of the sloping side wall face.

Alternatively, the filter element can be provided with the opening, in which case the filter housing comprises the protrusion. The opening has a mouth which opens in axial direction towards the second axial end of the filter element. The mouth is, viewed in tangential direction, wider than, viewed in tangential direction, the protrusion of the filter housing for allowing the protrusion to enter into the opening when inserting the filter element, with its second end part directed to the second axial end of the filter housing, axially into the housing and for allowing the protrusion to be withdrawn from the opening when removing the filter element axially out of the housing.

The opening of the filter element is, viewed from the mouth, undercut. The opening has a sloping side wall face which slopes with respect to the axial direction. The slope of the sloping side wall face of the opening in the filter element is such that, when the protrusion of the filter housing has been received in the opening and is withdrawn axially from the opening, the sloping side wall face guides the protrusion out of the mouth. When the protrusion is withdrawn axially and is engaged by the sloping side wall face, the protrusion and opening will slightly rotate with respect to each other.

In an embodiment of the filter element provided with the opening, the slope of the sloping side wall face is in the range of 20°-40° with respect to the axial direction of the filter element.

In an embodiment of the filter element provided with the opening, the mouth is provided in a ring shaped wall, wherein, viewed in tangential direction, the mouth has a first side where the sloping side wall face is provided and an opposing second side; and wherein the ring shaped wall is provided with an axial projection, the axial projection being arranged adjacent the mouth at the second side of the entry mouth.

For example, the ring shaped wall has an axially facing front face, which is shaped with a pitch angle, the pitch angle being preferably at most 10°.

In an embodiment of the filter element provided with the opening, the projection has a guide surface for guiding the protrusion over the projection when the protrusion runs over the projection from its side opposing the side adjacent the mouth towards the mouth.

In an embodiment of the filter element, the second end part of the filter element is provided with a sealing ring, such as an O-ring, having a ring axis perpendicular to a sealing ring plane defined by the sealing ring, wherein the ring axis and the longitudinal axis of the filter element extend at an acute angle with respect to each other, preferably in the range of 4-15°.

The invention further relates to a method of removing a filter element from a filter assembly comprising a head, a filter housing which can be removably connected to the head, and a filter element received in the filter housing;
wherein the filter housing comprises a first axial end and a second axial end, wherein the first axial end is provided with a first rotational connector part;
wherein the head comprises a second rotational connector part which can be removably engaged by the first rotational connector parts; wherein the housing can be connected to and detached from the head by mutual rotation in a first direction of rotation respectively a second direction of rotation opposite to the first direction of rotation;
wherein the filter element comprises:
  a tubular wall provided with a filtration medium;
  a first end part provided at a first axial end of the filter element; and
  a second end part provided at a second axial end of the filter element;
wherein the second end part of the filter element and the second axial end of the tubular housing are provided with a locking assembly; comprising:
  an opening provided at one of either the filter element or the tubular housing; and
  a protrusion provided at the other one of either the filter element or the filter housing which is adapted to project in the opening;
wherein the opening comprises a mouth which opens in axial direction, which mouth is, viewed in tangential direction, wider than, viewed in tangential direction, the protrusion;
wherein the opening comprises a sloping side wall face which slopes with respect to the axial direction, which sloping side wall face, viewed in axial direction from the mouth into the opening, widens said opening;
wherein the method starts from a condition in which:
  the filter housing is connected to head and
  the filter element has been received in the tubular housing with the protrusion projecting in the opening;
wherein the method comprises:
  detaching the filter housing from the head by rotating the housing with respect to the head in the second direction of rotation, in which the filter element is drawn tight towards the second axial end of the filter housing by engagement of the sloping side wall face of the opening, on the one hand, with the protrusion, on the other hand;
  removing the filter housing together with the filter element received in the filter housing from the head;
removing the filter element from the housing in axial direction, which removing comprises withdrawing the protrusion axially from the opening through the mouth wherein the sloping side wall face guides the protrusion in the second direction of rotation out of the mouth.

The invention further relates also to a method of replacing, in a filter assembly comprising a head, a filter housing which can be removably connected to the head, and a filter element which has been received in the filter housing, the filter element by a further filter element, the filter housing comprising a first axial end and a second axial end, wherein the first axial end is provided with a first rotational connector part;

the head comprising a second rotational connector part which can be removably engaged by the first rotational connector parts; wherein the housing can be connected to and detached from the head by mutual rotation in a first direction of rotation respectively a second direction of rotation opposite to the first direction of rotation;

the filter elements each comprising:
  a tubular wall provided with a filtration medium;
  a first end part provided at a first axial end of the filter element; and
  a second end part provided at a second axial end of the filter element;

wherein the second end part of each filter element and the second axial end of the tubular housing are provided with a locking assembly; comprising:
  an opening provided at one of either the filter element or the tubular housing; and
  a protrusion provided at the other one of either the filter element or the filter housing which is adapted to project in the opening;

wherein the opening comprises a mouth which opens in axial direction, which mouth is, viewed in tangential direction, wider than, viewed in tangential direction, the protrusion;

wherein the opening comprises a sloping side wall face which slopes with respect to the axial direction, which sloping side wall face, viewed in axial direction from the mouth into the opening, widens said opening;

wherein the method starts from a condition in which:
  the filter housing is connected to head and
  the filter element has been received in the tubular housing with the protrusion projecting in the opening;

wherein the method comprises:
  detaching the filter housing from the head by rotating the housing with respect to the head in the second direction of rotation, in which the filter element is drawn tight towards the second axial end of the filter housing by tangential engagement of the sloping side wall face of the opening, on the one hand, with the protrusion, on the other hand;
  removing the filter housing together with the filter element received in the filter housing from the head;
  removing the filter element from the housing in axial direction, which removing comprises withdrawing the protrusion axially from the opening through the mouth wherein the sloping side wall face guides the protrusion to the mouth in the second direction of rotation;
  inserting the further filter element axially into the housing and connecting the filter housing with inserted further filter element to the head by rotating the housing with respect to the head in the first direction of rotation,
  axially aligning the protrusion with the mouth followed by axially entering the protrusion into the opening through the mouth.

When withdrawing the protrusion axially from the opening, the protrusion can be guided to the mouth by the sloping side wall face of the opening.

It is possible that the protrusion is axially aligning with the mouth by rotating the further filter element with respect to the filter housing in the first or second direction of rotation. When the filter housing with accommodated further filter element is attached to the head, the protrusion can be axially aligned with the mouth and axially entered into the opening through the mouth. The filter element is positioned and locked with respect to the filter housing automatically when installing the filter housing to the head.

BRIEF DESCRIPTION OF THE DRAWINGS

The invention will now be described, by way of example only, with reference to the figures.

FIG. 5 is a view showing as a detail view the housing part and filter element part of the locking assembly of the embodiment of FIG. 4 in disconnected state.

DETAILED DESCRIPTION OF THE INVENTION

Figure 1:
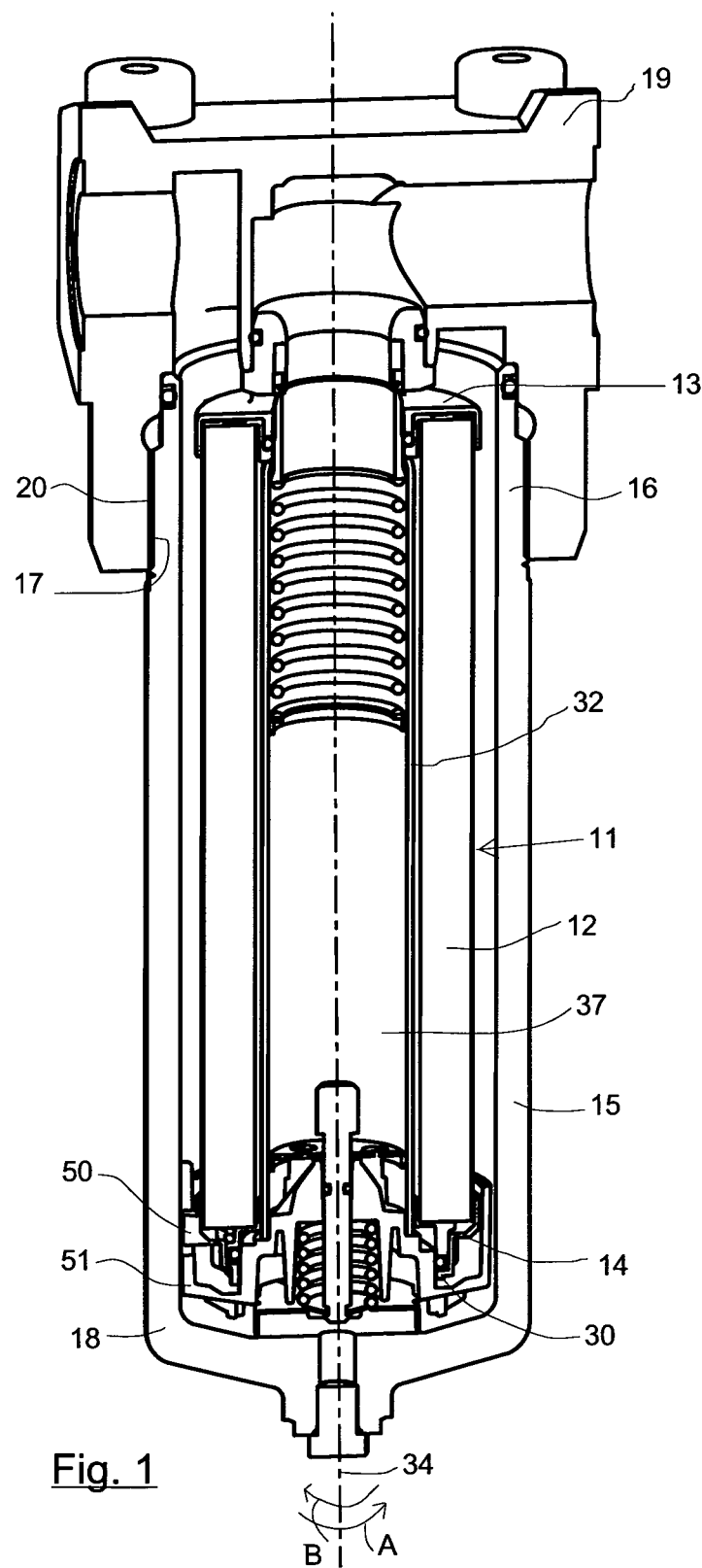
FIG. 1 is a cross section illustrating a first embodiment of a filter assembly according to the invention.

The filter assembly shown in FIG. 1 comprises a head 19, a filter housing 15 which can be removably connected to the head 19, and a filter element 11 which can be received in the filter housing 15.

The filter element 11 comprises a tubular wall 12 which is made of a filtration medium. For example, the filter medium is corrugated filter paper, nonwoven cloth or the like formed into a cylinder, pleated filter paper, non-woven glass fibre or stainless steel wiremesh. The filter element 11 has a first end part or upper end part 13 provided at a first axial end or upper axial end of the filter element 11 and a second end part or lower end part 14 provided at a second axial end or lower axial end 30 of the filter element 11. The filter element 11 has a longitudinal axis 34 which extends in an axial direction of the filter element 11.

The filter housing 15 also comprises a first axial end or upper axial end 16 and a second axial end or lower axial end 18. The upper axial end 16 is provided with a first rotational connector part 17. The head 19 comprises a second rotational connector part 20 which can be removably engaged by the first rotational connector part 17. In this exemplary embodiment, the rotational connector parts 17, 20 are designed as threads. The housing 15 can be connected to the head 19 by rotating the housing 15 with respect to the head 19 in a first direction (A) of rotation until the threads 17, 20 are screwed home. The housing 15 can be detached from the head 19 by rotating the housing 15 with respect to the head 19 in a second, opposite direction (B) of rotation.

The filter housing 15 further comprises a core element 32, which is preferably attached to the filter housing 15 at its lower axial end 18, so that the core element 32 is removed from the head 19 together with the housing 15. As the core element 32 is attached to the housing 15, it is further prevented that the core element might stay inside the filter element and erroneously be disposed of together with the filter element. The core element serves to protect the filter element against radial inward compression as a result from external pressure exerted by the fluid to be filtered. In order to allow fluid to pass through the wall of the core element, the core element is in general perforated all over its wall. The core element can be attached to the housing in many different manners. For example the core element 32 could be welded directly to the bottom of the housing 15 at the lower end 18. Another way of attaching the core element to the housing at the lower end 18 is by use of a leaf spring 53 as is explained detailed in PCT/NL2009/000137 of 22 Jun. 2009 in the name of the same applicant.

The filter element 11 can be accommodated axially into the filter housing 15 with its lower end part 14 into the lower axial end 18 of the filter housing 15. The lower end part 14 of the filter element 11 and the lower axial end 18 of the filter housing 15 are provided with a locking assembly 50, 51. In this exemplary embodiment, the housing part 51 of the locking assembly includes a ring shaped wall 26 which is attached to the filter housing 15, and an opening 21 which is provided in the ring shaped wall 26. The ring shaped wall 26 has a front face 40 facing axially. The filter element part 50 of the locking assembly carries a protrusion 22 which is arranged at the filter element 11 (see FIG. 2).

Figure 2:
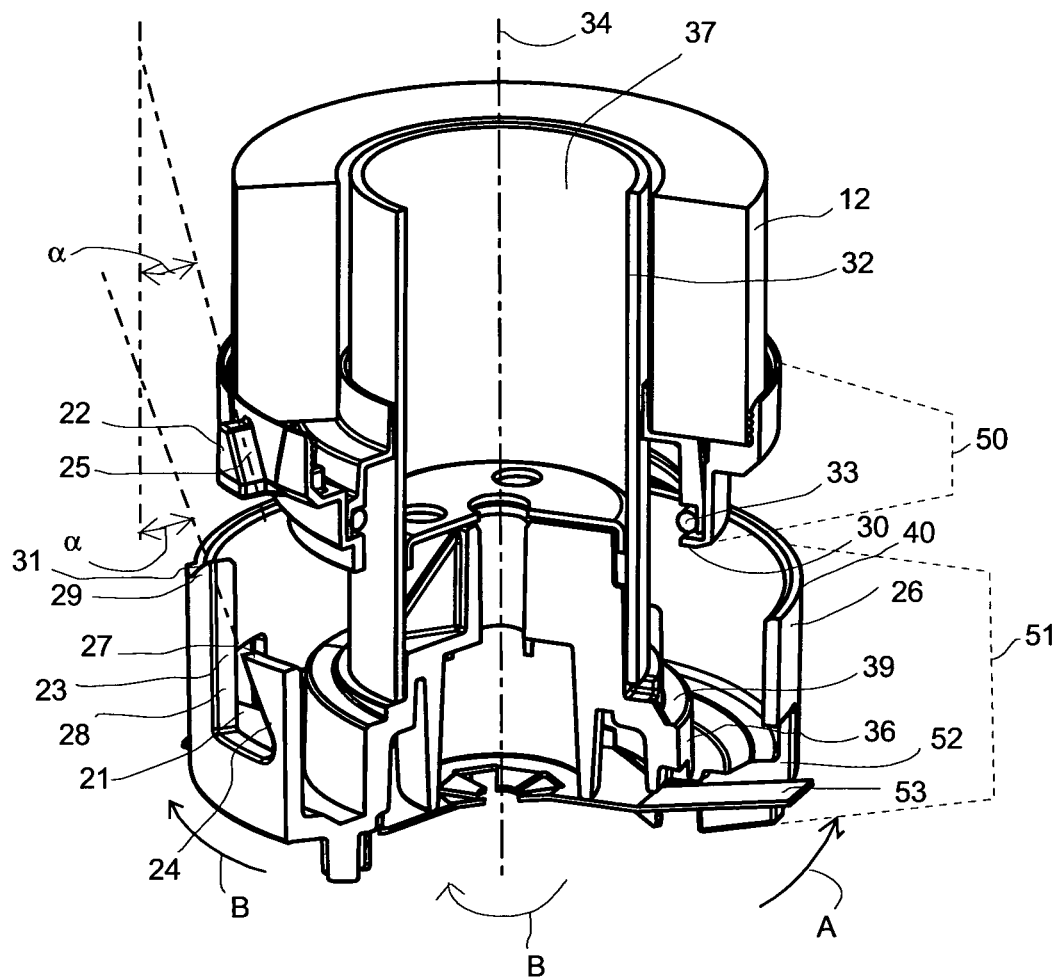
FIG. 2 is an exploded view of a lower axial end of the filter assembly shown in FIG. 1.

The opening 21 comprises a mouth 23 which opens in axial direction, upwards in the embodiment shown in FIGS. 1 and 2. The mouth 23 is, viewed in tangential direction, wider than, viewed in tangential direction, the protrusion 22 for allowing the protrusion 22 to enter into and out of the opening 21. The opening 21 is undercut viewed from the mouth 23 into the opening 21. Viewed in tangential direction, the opening 21 has a first side 27 and an opposing second side 28. The second side of the opening 28 extends essentially in axial direction.

A sloping side wall face 24 is provided at the first side 27. The sloping side wall face 24 slopes with respect to the axial direction. In this exemplary embodiment, the slope α is in the range of 20°-40°—in the shown embodiments about 30°—with respect to the axial direction. Viewed from the lower axial end 18 to the upper axial end 16 of the filter housing, the sloping side wall face 24 slopes in the second direction (B) of rotation.

The side of the protrusion 22 facing the sloping side wall face 24 of the opening 21 is provided with a sloping protrusion face 25 having a slope a which corresponds to the slope α of the sloping side wall face 24. When the protrusion 22 has been received in the opening 21 and the protrusion 22 is withdrawn axially from the opening 21, the sloping side wall face 24 guides the protrusion 22 to the mouth 23 while the protrusion 22 slightly rotates in the second direction (B) of rotation.

The ring shaped wall 26 has an axially facing front face, which is shaped with a pitch angle. For example, the pitch angle is approximately 10°. In addition, the ring shaped wall 26 is provided with an axial projection 29 which is arranged adjacent to the mouth 23 at the second side 28 of the mouth 23. The projection 29 has a guide surface 31 for guiding the protrusion 22 over the projection 29 when the protrusion 22 is moved over the projection 29 in the first direction (A) of rotation, i.e. towards the mouth 23.

The lower end part 14 of the filter element 11 is provided with a sealing ring 33, such as an O-ring. The sealing ring has a ring axis 35 which runs perpendicular to a sealing ring plane defined by the sealing ring 33. The ring axis 35 and the longitudinal axis 34 of the filter element 11 extend at an acute angle (β) with respect to each other. For example, the acute angle is in the range of 4-15° (see FIG. 3). The filter housing 15 is provided at its lower axial end 18 with a sealing seat 36 which is adapted to the sealing ring 33 for sealing the interior 37 of the filter element 11 with respect to the lower axial end 18 of the filter housing 15.

When the protrusion 22 has been axially aligned with the mouth 23 and positioned outside the opening 21 directly adjacent the mouth 23, the sealing ring 33 is at a distance from the sealing seat 36. The sealing seat 36 faces radially and adjoins a ring shaped front face 39 facing axially towards the upper axial end 16 of the housing 15. The front face 39 defines a front face plane. When the protrusion 22 has been received in the opening 21, the front face plane is parallel to the sealing ring plane and the sealing ring 33 seals against the sealing seat 36 such that a circumferential seal is provided which seals along the entire sealing ring 33.

Figure 3:
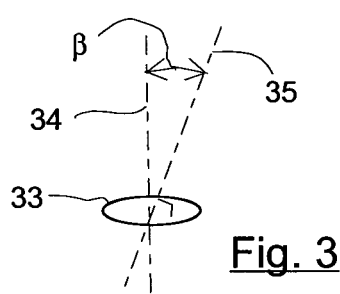
FIG. 3 is a schematic view illustrating the inclination of the sealing ring.
Figure 4:
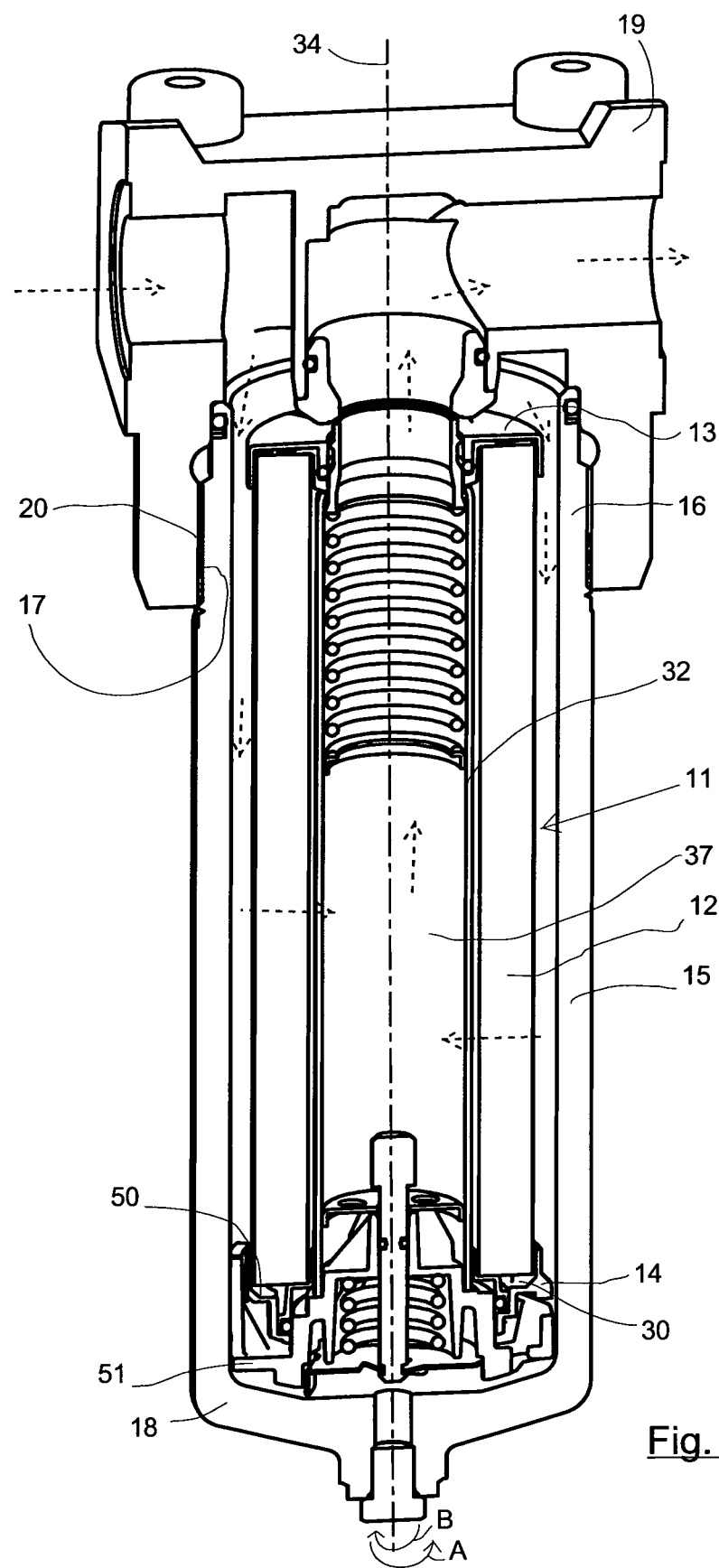
FIG. 4 is a perspective view illustrating a second embodiment of a filter assembly according to the invention.

FIG. 4 shows a second embodiment of the filter assembly according to the invention. This second embodiment substantially corresponds to the first embodiment described with reference to FIGS. 1-3. Therefore, the same or similar components are designated by the same reference numerals.

The embodiment shown in FIG. 4 differs from the embodiment shown in FIGS. 1-3 by the fact that the filter element 11 is provided with the opening 21 and the filter housing 15 is provided with the protrusion 22. As a result, the mouth 23 opens into the direction of the lower axial end 18 of the filter housing 15, and the sloping side wall face 24, viewed from the first axial end 16 to the second axial end 18, slopes in the first direction (A) of rotation.

Leaf springs, like 53 in FIG. 2, extending through apertures 53 41 serve to attach the housing part 51 to the filter housing 15. In the embodiment according to FIGS. 1-3, the housing part 51 is provided with the opening 21 and in the embodiment according to FIGS. 4-5 the housing part 51 is provided with the protrusion 22. As will be clear, the housing part 51 can according to the invention be attached to the filter housing 15 in many different manners, like gluing, welding. It is according to the invention also conceivable that the housing part 51 is an integral part of the filter housing 15 or that the opening 21 or protrusion 20 is formed directly in or with the housing.

Figure 5A:
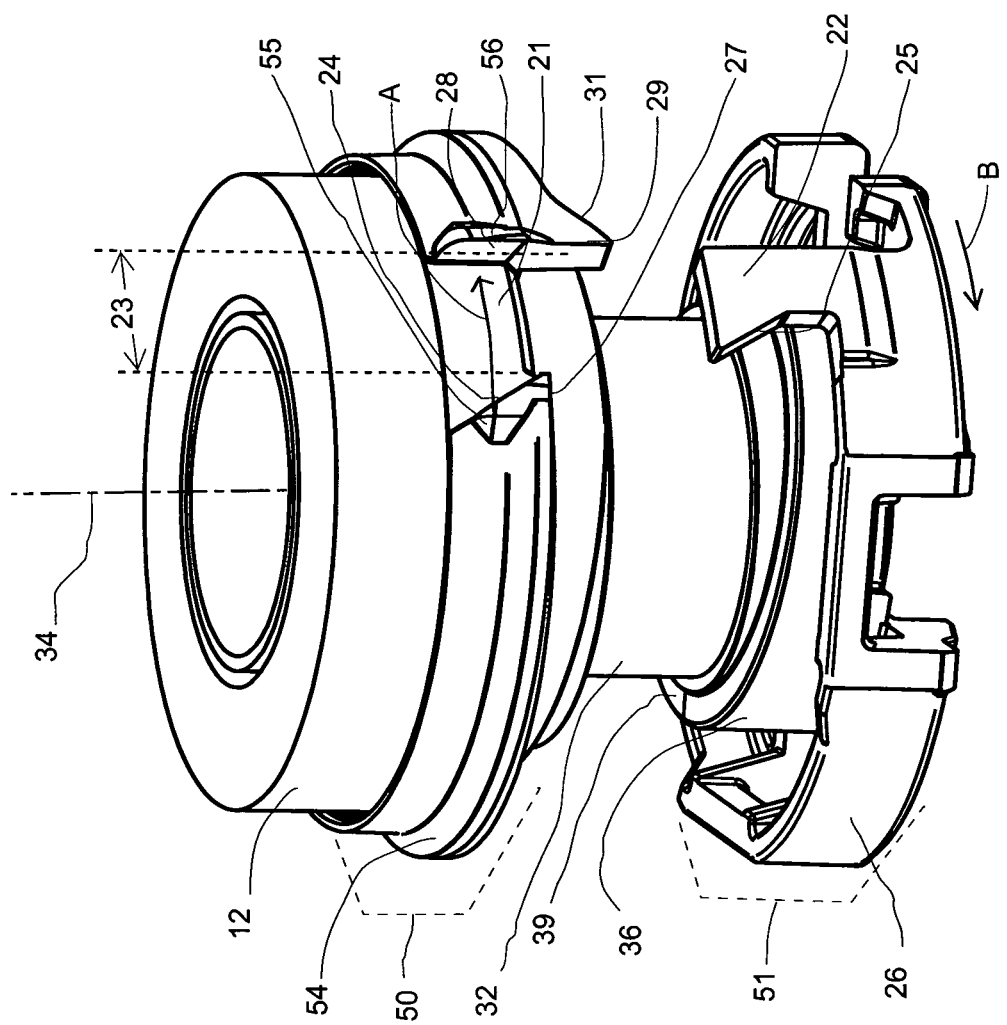
FIG. 5*a* is a perspective downward view and FIG. 5*b* is a perspective upward view.
Figure 5B:
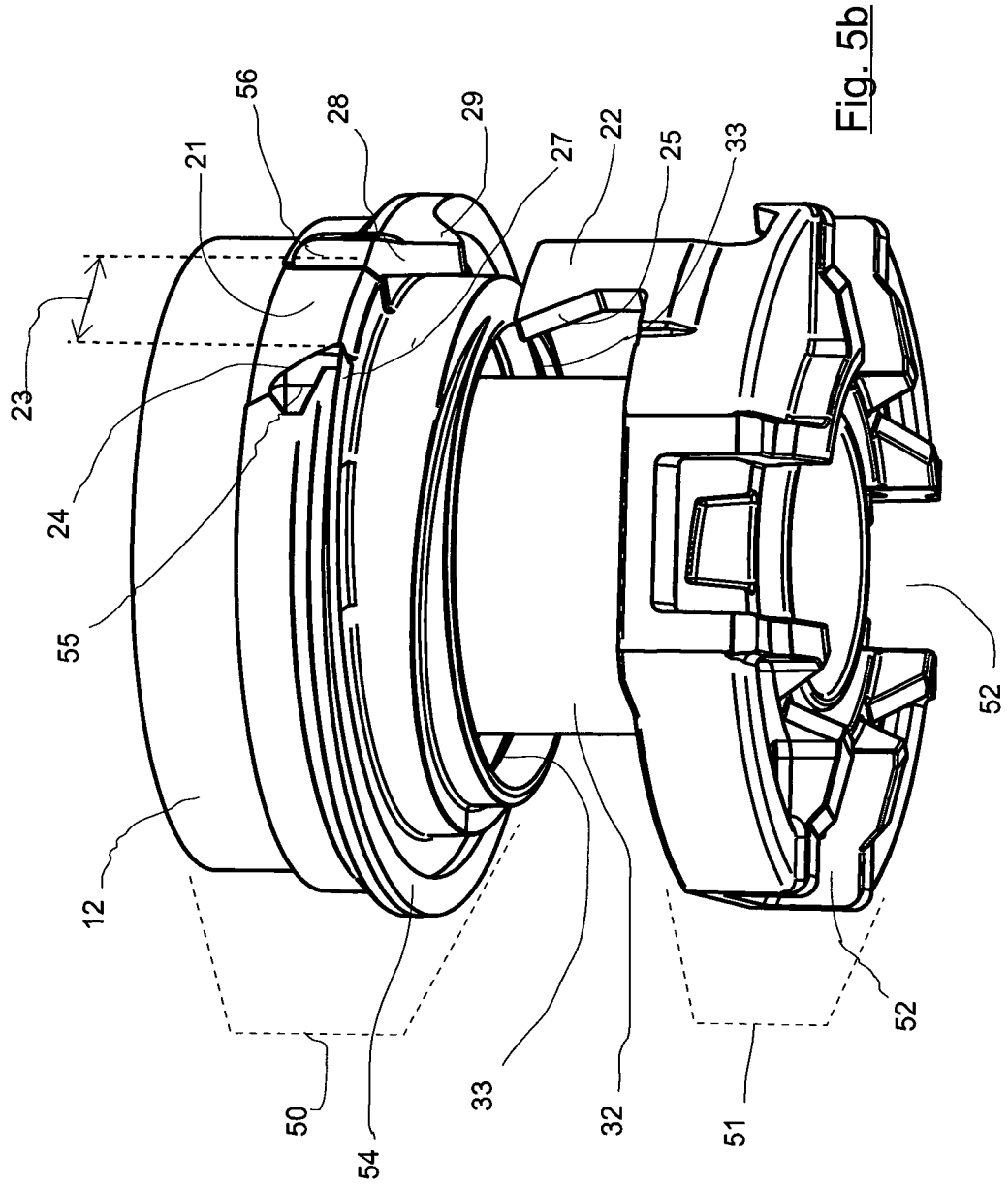
Figure 6:
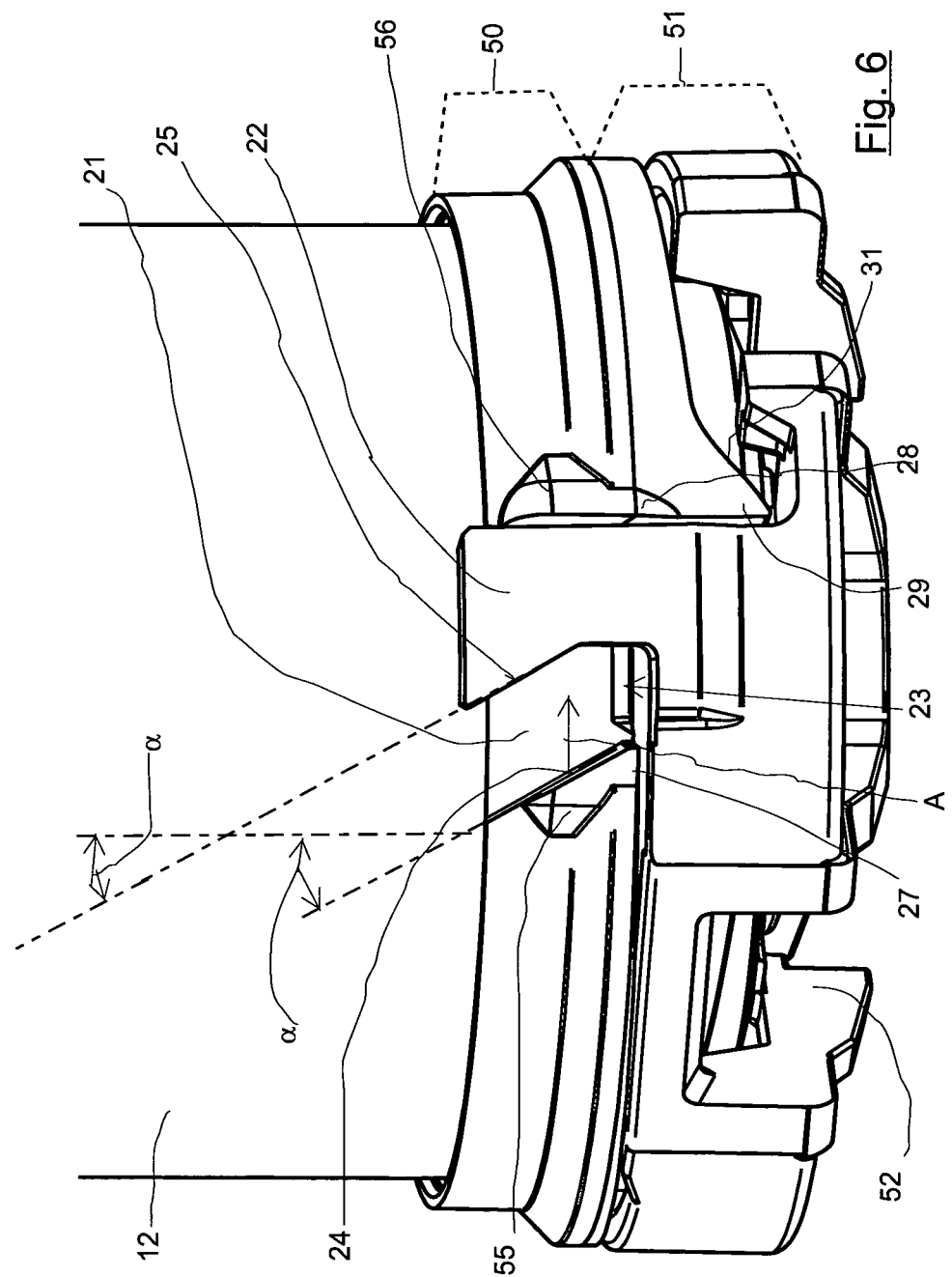
FIG. 6 shows, in side view, the same as FIG. 5, however now in connected state.

Further referring to the embodiment of FIGS. 4-6, the undercut opening 21 is in fact formed in a flange 54, which is on its upper side provided with a rib 55 defining the sloping side wall face 24 and the first side 27 of the opening 21 as well as with a rib 56 defining the second side 28 of the opening with an essentially axial face. The opening 21 has a mouth 23 at the lower side of the opening. Further the undercut opening 21 is in this embodiment also open at the upper side opposite the mouth 23.

Further, in FIG. 5b one can see the sealing 33 having a ring axis 35 which extends—see FIG. 3—at an acute angle β with respect to the longitudinal axis 34 of the filter element 12 (so called slanting arrangement); and in FIG. 5a one can see the sealing seat 36 with ring face 39, wherein the ring face 39 defines a plane having a perpendicular axis extending at an acute angle β with respect to the longitudinal axis 34 of the filter element. In the embodiment of FIG. 5b the sealing ring 33 is ribbon shaped with—in axial direction—a width of about 3-5 mm. It is note that in FIG. 5b the indication lines of reference number 33 end at the lower edge of the ribbon shaped sealing ring 33, and that due to the slanting arrangement of the sealing ring the upper edge of the ribbon shaped sealing ring is visible on the right side of FIG. 5b but not visible on the left side of FIG. 5b.

The invention is not limited to the embodiments shown in the figures. The skilled person can make various modifications without leaving the scope of the invention.

It should be noted that the inclined sealing ring has independent significance and could be the subject of a divisional application. This aspect can be described as follows:

A filter assembly, comprising a head, a filter housing which can be removably connected to the head, and a filter element which can be received in the filter housing, the filter element comprising a tubular wall provided with a filtration medium, a longitudinal axis, a first end part provided at a first axial end of the filter element, and a second end part provided at a second axial end of the filter element, the filter housing comprising a first axial end and a second axial end, the second end part of the filter element being provided with a sealing ring, such as an O-ring, having a ring axis perpendicular to a sealing ring plane defined by the sealing ring, wherein the ring axis and the longitudinal axis of the filter element extend at an acute angle with respect to each other, preferably in the range of 4-15°, and wherein the filter housing is provided at its second axial end with a sealing seat which is adapted to the sealing ring of the filter element. Thus, the interior of the filter element can be sealed with respect to the second axial end of the filter housing. A filter assembly of this type can be provided with one or more of the features of the dependent claims.

In addition, the aspect of the inclined sealing ring relates to the following: A filter element comprising a tubular wall provided with a filtration medium, a longitudinal axis, a first end part provided at a first axial end of the filter element; and a second end part provided at a second axial end of the filter element, the second end part of the filter element being provided with a sealing ring, such as an O-ring, having a ring axis perpendicular to a sealing ring plane defined by the sealing ring, wherein the ring axis and the longitudinal axis of the filter element extend at an acute angle β with respect to each other, preferably in the range of 4-15°. A filter element of this type can be provided with one or more of the features of the dependent claims.

The invention claimed is:

1. A filter assembly, comprising a head, a filter housing which can be removably connected to the head, and a filter element which can be received in the filter housing,
the filter element comprising:
a tubular wall provided with a filtration medium;
a first end part provided at a first axial end of the filter element; and
a second end part provided at a second axial end of the filter element;
the filter housing comprising a first axial end and a second axial end, wherein the first axial end is provided with a first rotational connector part;
the head comprising a second rotational connector part which can be removably engaged by the first rotational connector part,
wherein the housing can be connected to the head by rotating the housing with respect to the head in a first direction of rotation and wherein the housing can be detached from the head by rotating the housing with respect to the head in a second direction of rotation, the second direction of rotation being opposite to the first direction of rotation;
wherein the second end part of the filter element and the second axial end of the filter housing are provided with a locking assembly comprising:
an opening provided at one of either the filter element or the filter housing; and
a protrusion provided at the other one of either the filter element or the filter housing which is adapted to project in the opening;
wherein the opening comprises a mouth which opens in axial direction, which mouth is, viewed in tangential direction, wider than, viewed in tangential direction, the protrusion for allowing the protrusion to enter into the opening when inserting the filter element, with its second end part directed to the second axial end of the filter housing, axially into the housing and for allowing the protrusion to be withdrawn from the opening when removing the filter element axially out of the housing;
wherein the opening comprises a sloping side wall face sloping with respect to the axial direction, which sloping side wall face, viewed in axial direction from the mouth into the opening, widens said opening such that, when the protrusion has been received in the opening and is withdrawn axially from the opening, the sloping side wall face guides the protrusion in the second direction of rotation out of the mouth; and
wherein the opening is provided in a ring shaped wall;
wherein, viewed in tangential direction, the mouth has a first side where the sloping side wall face is provided and an opposing second side; and
wherein the ring shaped wall is provided with an axial projection, the axial projection being arranged adjacent the mouth at the second side of the mouth.

2. The filter assembly according to claim 1, wherein the side of the protrusion facing the sloping side wall face of the opening is provided with a sloping protrusion face having a slope (α) which corresponds to the slope (α) of the sloping side wall face.

3. The filter assembly according to claim 1, wherein the slope (α) of the side wall face is in the range of 20°-40° with respect to the axial direction.

4. The filter assembly according to claim 2, wherein the slope (α) of the side wall face is in the range of 20°-40° with respect to the axial direction.

5. The filter assembly according to claim 1, wherein the filter element is provided with the protrusion and wherein the filter housing is provided with the opening, wherein the mouth opens into the direction of the first axial end of the filter housing, and wherein the sloping side wall face, viewed from the second axial end to the first axial end, slopes in the second direction of rotation such that, when the filter housing is being removed from the head by rotating the housing with respect to the head in the second direction of rotation, the filter element is drawn tight towards the second axial end of the filter housing by engagement of the sloping side wall face of the opening with the protrusion.

6. The filter assembly according to claim 1, wherein the filter element is provided with the opening and wherein the filter housing is provided with the protrusion, and wherein the mouth opens into the direction of the second axial end of the filter housing, and wherein the sloping side wall face, viewed from the first axial end to the second axial end, slopes in the first direction of rotation such that, when the filter housing is being removed from the head by rotating the housing with respect to the head in the second direction of rotation, the filter element is drawn tight towards the second axial end of the filter housing by engagement of the sloping side wall face of the opening with the protrusion.

7. The filter assembly according to claim 1, wherein the ring shaped wall has an axially facing front face, which is shaped with a pitch angle.

8. The filter assembly according to claim 7, wherein the pitch angle is at most 10°.

9. The filter assembly according to claim 1, wherein the projection has a guide surface for guiding the protrusion over the projection when the protrusion runs over the projection from its side opposing the side adjacent the mouth towards the mouth.

10. The filter assembly according to claim 7, wherein the projection has a guide surface for guiding the protrusion over the projection when the protrusion runs over the projection from its side opposing the side adjacent the mouth towards the mouth.

11. The filter assembly according to claim 1, wherein the second end part of the filter element is provided with a sealing ring having a ring axis perpendicular to a sealing ring plane defined by the sealing ring, wherein the ring axis and the longitudinal axis of the filter element extend at an acute angle ($\beta$) with respect to each other, and wherein the filter housing is provided at its second axial end with a sealing seat which is adapted to the sealing ring for sealing the interior of the filter element with respect to the second axial end of the filter housing.

12. The filter assembly according to claim 11, wherein said acute angle ($\beta$) is in the range of 4-15°.

13. The filter assembly according to claim 11, wherein the sealing seat faces radially; wherein a ring face facing axially towards the first axial end adjoins the sealing seat; wherein the ring face defines a ring face plane; and wherein, when the protrusion has been received in the opening, the ring face plane is parallel to the sealing ring plane.

14. The filter assembly according to claim 13, wherein, when the protrusion has been axially aligned with the mouth and positioned outside the opening directly adjacent the mouth, the sealing ring is at a distance from the sealing seat.

15. The filter assembly according to claim 1, wherein, when the protrusion has been received in the opening, the protrusion is movable between a position in which the protrusion is aligned with the mouth of the opening and a position in which the protrusion, viewed in axial direction, overlaps at least partially with the sloping side wall face.

16. A filter element comprising:
a tubular wall provided with a filtration medium;
a first end part provided at a first axial end of the filter element; and
a second end part provided at a second axial end of the filter element;
wherein the second end part of the filter element is provided with an opening which comprises a mouth which opens in axial direction, and wherein the opening comprises a sloping side wall face which slopes at a slope ($\alpha$) with respect to the axial direction of the filter element, and wherein the sloping side wall face, viewed in axial direction from the mouth into the opening, widens said opening;
wherein the opening is provided in a ring shaped wall;
wherein, viewed in tangential direction, the mouth has a first side where the sloping side wall face is provided and an opposing second side; and
wherein the ring shaped wall is provided with an axial projection, the axial projection being arranged adjacent the mouth at the second side of the entry mouth.

17. The filter element according to claim 16, wherein, viewed in axial direction from the second end part of the filter element to the first end part of the filter element, the sloping side wall face is arranged at that side of the opening which faces, with respect to the longitudinal axis of the filter element, in clock-wise direction.

18. The filter element according to claim 16, wherein the filter element is adapted to be received in a filter housing of a filter assembly.

19. The filter element according to claim 16, wherein the said slope ($\alpha$) is in the range of 20°-40° with respect to the axial direction of the filter element.

20. The filter element according to claim 16, wherein the ring shaped wall has an axially facing front face, which is shaped with a pitch angle.

21. The filter element according to claim 20, wherein the pitch angle being is at most 10°.

22. The filter element according to claim 16, wherein the projection has a guide surface for guiding the protrusion over the projection when the protrusion runs over the projection from its side opposing the side adjacent the mouth towards the mouth.

23. The filter element according to claim 20, wherein the projection has a guide surface for guiding the protrusion over the projection when the protrusion runs over the projection from its side opposing the side adjacent the mouth towards the mouth.

24. The filter element according to claim 16, wherein the second end part of the filter element is provided with a sealing ring having a ring axis perpendicular to a sealing ring plane defined by the sealing ring, wherein the ring axis and the longitudinal axis of the filter element extend at an acute angle ($\beta$) with respect to each other.

25. The filter element according to claim 24, wherein said acute angle ($\beta$) is in the range of 4-15°.

26. A filter assembly, comprising a head, a filter housing which can be removably connected to the head, and a filter element which can be received in the filter housing,
the filter element comprising:
a tubular wall provided with a filtration medium;
a first end part provided at a first axial end of the filter element; and
a second end part provided at a second axial end of the filter element;
the filter housing comprising a first axial end and a second axial end, wherein the first axial end is provided with a first rotational connector part;
the head comprising a second rotational connector part which can be removably engaged by the first rotational connector part,
wherein the housing can be connected to the head by rotating the housing with respect to the head in a first direction of rotation and wherein the housing can be detached from the head by rotating the housing with respect to the head in a second direction of rotation, the second direction of rotation being opposite to the first direction of rotation;
wherein the second end part of the filter element and the second axial end of the filter housing are provided with a locking assembly comprising:
an opening provided at one of either the filter element or the filter housing; and
a protrusion provided at the other one of either the filter element or the filter housing which is adapted to project in the opening;
wherein the opening comprises a mouth which opens in axial direction, which mouth is, viewed in tangential direction, wider than, viewed in tangential direction, the protrusion for allowing the protrusion to enter into the opening when inserting the filter element, with its second end part directed to the second axial end of the filter housing, axially into the housing and for allowing the protrusion to be withdrawn from the opening when removing the filter element axially out of the housing;
wherein the opening comprises a sloping side wall face sloping with respect to the axial direction, which sloping side wall face, viewed in axial direction from the mouth into the opening, widens said opening such that, when the protrusion has been received in the opening and is withdrawn axially from the opening, the sloping side wall face guides the protrusion in the second direction of rotation out of the mouth;
wherein the second end part of the filter element is provided with a sealing ring having a ring axis perpendicular to a sealing ring plane defined by the sealing ring, wherein the ring axis and the longitudinal axis of the filter element extend at an acute angle (β) with respect to each other, and wherein the filter housing is provided at its second axial end with a sealing seat which is adapted to the sealing ring for sealing the interior of the filter element with respect to the second axial end of the filter housing.

27. The filter assembly according to claim 26, wherein said acute angle (β) is in the range of 4-15°.

28. The filter assembly according to claim 26, wherein the sealing seat faces radially; wherein a ring face facing axially towards the first axial end adjoins the sealing seat; wherein the ring face defines a ring face plane; and wherein, when the protrusion has been received in the opening, the ring face plane is parallel to the sealing ring plane.

29. The filter assembly according to claim 28, wherein, when the protrusion has been axially aligned with the mouth and positioned outside the opening directly adjacent the mouth, the sealing ring is at a distance from the sealing seat.

30. A filter element comprising:
a tubular wall provided with a filtration medium;
a first end part provided at a first axial end of the filter element; and
a second end part provided at a second axial end of the filter element;
wherein the second end part of the filter element is provided with an opening which comprises a mouth which opens in axial direction, and wherein the opening comprises a sloping side wall face which slopes at a slope (α) with respect to the axial direction of the filter element, and wherein the sloping side wall face, viewed in axial direction from the mouth into the opening, widens said opening; and
wherein the second end part of the filter element is provided with a sealing ring having a ring axis perpendicular to a sealing ring plane defined by the sealing ring, wherein the ring axis and the longitudinal axis of the filter element extend at an acute angle (β) with respect to each other.

31. The filter element according to claim 30, wherein said acute angle (β) is in the range of 4-15°.

* * * * *